United States Patent [19]

Schiffner

[11] 4,444,503

[45] Apr. 24, 1984

[54] RING INTERFEROMETER WITH A MODE DIAPHRAGM

[75] Inventor: Gerhard Schiffner, Munich, Fed. Rep. of Germany

[73] Assignee: Siemens Aktiengesellschaft, Berlin & Munich, Fed. Rep. of Germany

[21] Appl. No.: 178,787

[22] Filed: Aug. 18, 1980

[30] Foreign Application Priority Data

Sep. 7, 1979 [DE] Fed. Rep. of Germany ....... 2936284

[51] Int. Cl.³ .............................................. G01C 19/64
[52] U.S. Cl. .................................... 356/350; 356/351
[58] Field of Search .............................. 356/350, 351

[56] References Cited

U.S. PATENT DOCUMENTS 4,257,707 3/1981 Liertz et al. ....................... 356/73.1
4,302,107 11/1981 Schiffner et al. ................... 356/350
4,372,685 2/1983 Ulrich ................................. 356/350

OTHER PUBLICATIONS

"Fiber-Ring Interferometer: Polarization Analysis", Optics Letters, vol. 4, No. 5, May 1979, pp. 152-154, Ulrich et al.
"Fiber-Optic Rotation Sensing with Low Drift", Ulrich, Optics Letters, vol. 5, No. 5, May 1980, pp. 173-175.
"Re-Entrant Fiberoptic Approach to Rotation Sensing", Arditty et al., SPIE, vol. 157, Laser Inertal Rotation Sensors (1978), pp. 138-148.

Primary Examiner—Vincent P. McGraw

Attorney, Agent, or Firm—Hill, Van Santen, Steadman & Simpson

[57] ABSTRACT

A ring interferometer, which has a coiled waveguide having two ends with each end being provided with means for coupling light from a first source into the waveguide and for uncoupling light coupled into the opposite end of the waveguide, a first optical arrangement for superimposing the uncoupled light from the two ends of the waveguide and forming two portions, an optical arrangement for directing one of the portions of the output coupled light at a first light receiving surface over a common path in a direction opposite to a direction of light from said first source characterized by a mode diaphragm being arranged in the common path to receive the one portion of the superimposed beam and the light from the first source to reduce the number of modes being transmitted therein. Preferably, a second mode diaphragm is arranged in the path of the other portion and both diaphragms are preferably a monomode waveguide such as an optical glass fiber having a core surrounded by a cladding. Preferably, the interferometer includes a second light receiving surface arranged to receive light coupled out of the second mode diaphragm. In an embodiment, a second light source is provided which may have a different wavelength than the wavelength of the first mentioned light source and filters are provided in the path of the light directed at each light receiving surface so that only light from the second source is received by the first receiving surface and only light from the first source is received by the second receiving surface.

11 Claims, 4 Drawing Figures

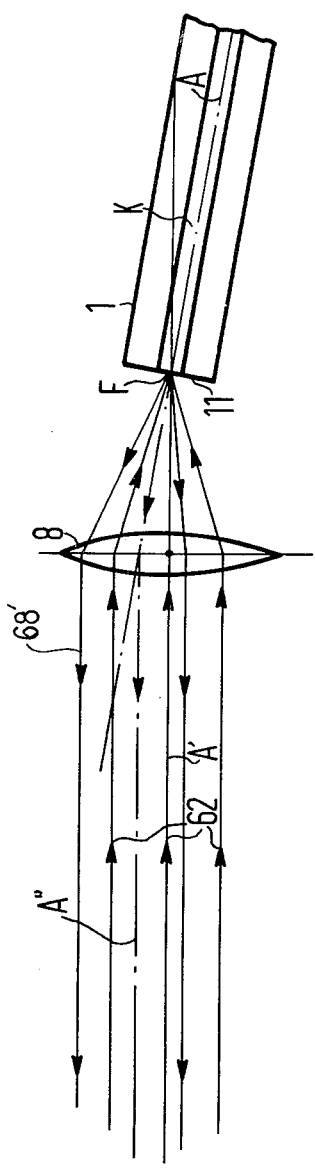
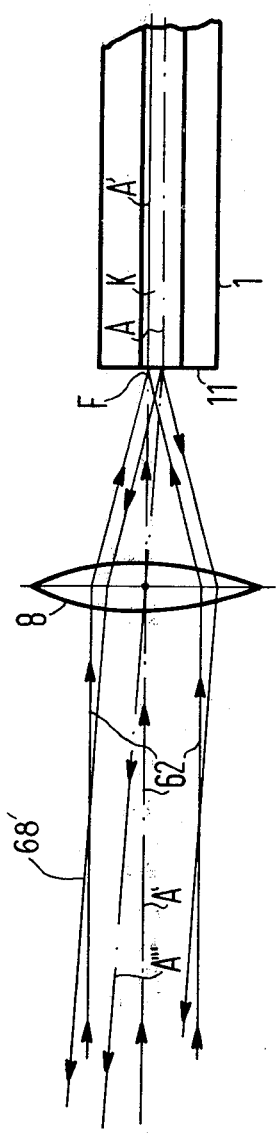
FIG 3
FIG 4

RING INTERFEROMETER WITH A MODE DIAPHRAGM

BACKGROUND OF THE INVENTION

The present invention is directed to a ring interferometer having an optical waveguide wound in the coil and having two ends, each end providing a separate coupling location at which light from a source is coupled into the light waveguide and propagated to the opposite end for uncoupling. The interferometer will include an arrangement for superimposing the light output coupled from each end of the optical waveguide and creating two portions of superimposed output coupled light and an arrangement for directing at least one portion of the output coupled light at a first light receiving surface over a common path in a direction opposite to a direction of the light from said source.

A ring interferometer of the above described type represents an arrangement for determining non-reciprocal transit time differences. If the interferometer is at rest or in uniform translational movement relative to an inertial system, the light propagation both in the light waveguide and in the air passages is reciprocal. For example, the optical wavelength of the light path is precisely the same for both directions of the propagation of the light. It is known that all dielectric material, which are used to construct light waveguides and are either at rest or in uniform translational movement relative to an inertial system, must always behave in a reciprocal fashion in the absence of a magnetic field. In the construction of the ring interferometer, it has now been proved that unexpected non-reciprocal effects can be observed, which simulate an acceleration movement, for example a rotation movement, which differs from zero.

SUMMARY OF THE INVENTION

The present invention is directed to providing means in a ring interferometer so that unexpected non-reciprocal effect and thus simulated acceleration or rotations can be rendered ineffective and can be eliminated.

To accomplish these goals, the present invention is directed to an improvement in a ring interferometer, which has an optical waveguide wound in a coil and having two ends, each end providing a separate coupling location at which light from a source is coupled into the light waveguide and propagated to the opposite end for uncoupling, said interferometer including first means for superimposing the light output coupled from one end with the light output coupled from the opposite end and creating two portions of the superimposed output coupled light, means for directing one portion of the output coupled light at a light receiving surface over a common path in a direction opposite to a direction of light from said source, said common path being capable of propagating a plurality of modes. The improvement comprises a mode diaphragm or mode filter being arranged in the common path to receive the one portion of the superimposed beam and the light from the source.

The improvement of the present invention is based on a novel recognition and discovery that the observed non-reciprocal behavior can be traced to the fact that in the air passages of the ring interferometer in which passages the light must pass through first in one direction and then in the opposite direction, the light traveling in the opposite direction travels along a somewhat different light path than the light traveling in the first direction. Under ideal circumstances, the mode diaphragm transmits only one mode and thus provides only one light path. However, when light is propagated in air, many light paths are possible relative to the optical axis of the ring interferometer. A further point is that the air modes of the high order can occur relative to the optical axes of the of the ring interferometer (compared to the enlarged fundamental mode of the single mode fiber propagating as a light beam along the optical axis).

As regard to the origin of this simulated, non-reciprocal effects or the simulated acceleration of rotation, it has been discovered that when beams are propagated in air, modes of a higher order can occur relative to the optical axes of the interferometer. When a non-ideal adjustment of the coupling points of a monomode light waveguide exists, these misadjustments are also the origin of the modes of a higher order.

The proposed improvement of the present invention is used to eliminate modes of a higher order so that these do not reach the light receiving surfaces. Thus, the high orders can no longer contribute to a simulation of a rotation.

A particularly advantageous embodiment of the invention occurs when a monomode light waveguide having two coupling points including means for input and output coupling light into each of said points is used as the mode diaphragm. Because a monomode light waveguide only actually propagates a single mode, it is superior to a known mode diaphragm, for example aperture diaphragms in which the opening has an extremely small diameter. When using a monomode light waveguide as the mode diaphragm, all other modes either cannot be propagated or are stripped off. Advantageous and expedient developments of the embodiment of a monomode light waveguide are an optical glass fiber having a core surrounded by a cladding with the fiber having the end surfaces forming each of the coupling points. In addition, the length of the glass fiber may be selected so that the cladding modes, which are propagated from one end surface towards the other end surface, are extinguished prior to reaching the other surface and/or the glass fiber is provided with means for stripping the cladding modes therefrom such as another jacket of a selected index or refraction which is higher than the index of refraction of the cladding layer. In all instances, it is desirable (but not necessary) that the monomode light waveguide, whether it is an optical glass fiber or not, is wound in a coil.

It is expedient to provide a second light receiving surface for the other portion of the superimposed output coupled light and to direct this other portion through a mode diaphragm. In particular it is desirable that the interferometer includes means for directing the other portion of the two portions of the superimposed output coupled light at the second light receiving surface and has a second mode diaphragm disposed in the path of said other portion.

In a preferred embodiment, the ring interferometer includes a separate second light source being arranged for coupling into the second mode diaphragm so that light can be coupled into said optical waveguide either from the first source through the first mode diaphragm or from the second source through the second mode diaphragm. Preferably each of the mode diaphragms are the same and are composed of the monomode light waveguide such as the optical glass fiber.

Since adjustment difficulties exist between the end of the mode diaphragm and the means for coupling light into the optical waveguide, and since it is extremely difficult to make the necessary fine adjustment, the two sources enable removing errors, which are induced into the detected signals because of adjustment problems. As point out, the mode diaphragms must be accurately adjusted with its optical axis relative to the optical axis of the optical waveguide or different modes of a higher order will be transmitted with other modes being filtered or gated out. Thus, such misalignment will create a non-reciprocal effect at the light receiving surface which is associated with the mode diaphragm that is not transmitting light from a source to the optical waveguide of the interferometer. By providing two separate light sources, and alternately operating the two sources, errors introduced in the mode diaphragm which is not transmitting light from the operating source to the interferometer can be cancelled out. In another embodiment, each of the light sources operates or emits light of a different wavelength or color and a filter is imposed in the path going to each light receiving surface with the filter for the first mentioned light receiving surface only passing light from the second light source and the filter associated with the second receiving surface passing only light of the wavelength from the first mentioned source. By utilizing such an arrangement, although the simulated phase shift is not eliminated in the embodiment, the true value of the rotation of speed can be obtained.

BRIEF DESCRIPTION OF THE DRAWINGS

FIGS. 3 and 4 represent enlarged cross-sectional views showing input and output coupling of light from one end of the optical waveguide with FIG. 3 illustrating the problems when the axes of the waveguide and the lens are inclined at an angle to each other, and FIG. 4 illustrating the problems that occur when the axes are parallel but displaced from one another.

DESCRIPTION OF THE PREFERRED EMBODIMENTS

Figure 1:
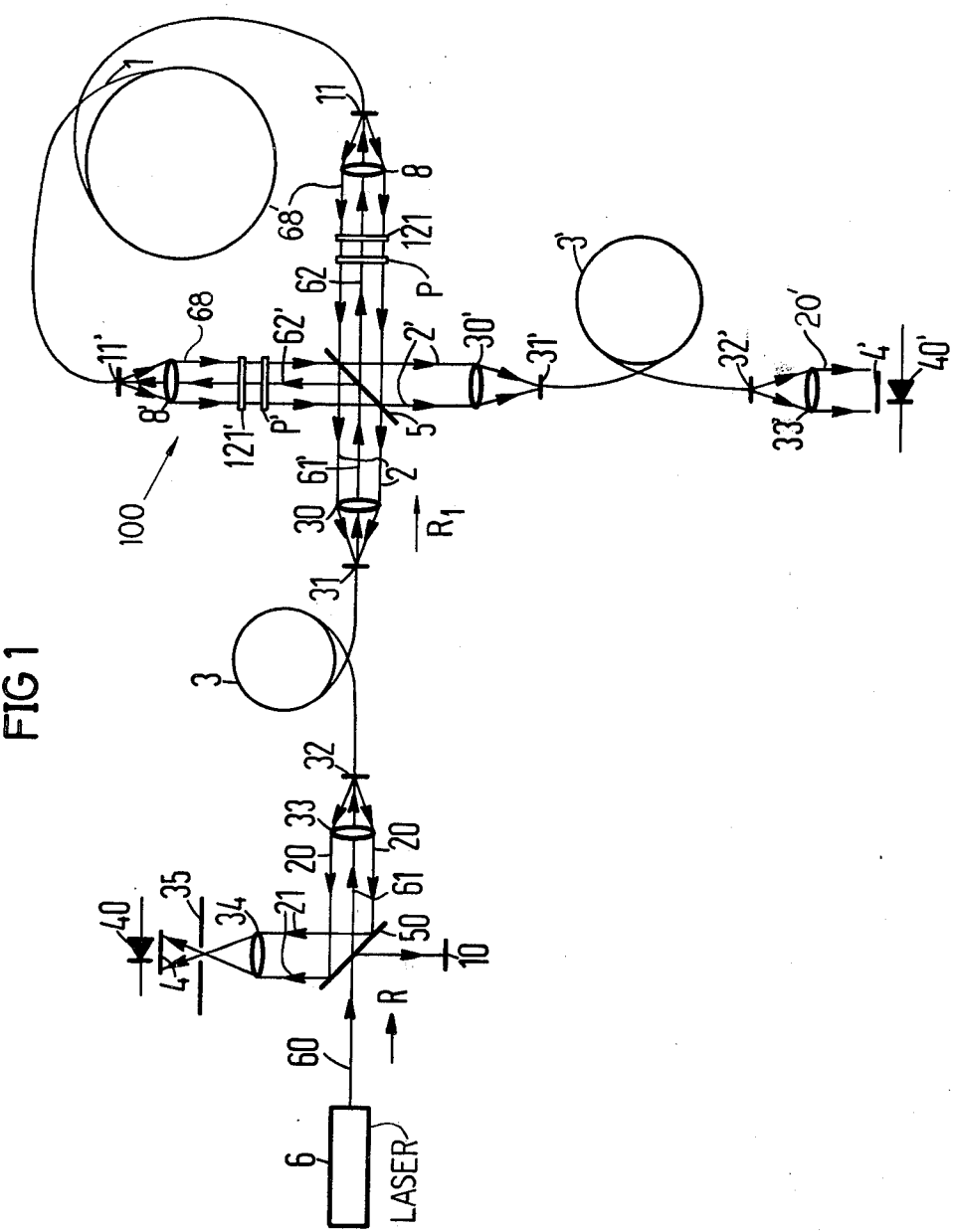
FIG. 1 is a schematic view of a ring interferometer in accordance with the present invention.

The principles of the present invention are particularly useful in a ring interferometer generally indicated at 100 and illustrated in FIG. 1. The ring interferometer 100 includes an optical waveguide 1 which has a pair of end surfaces 11 and 11' which form coupling points therefor.

The interferometer 100 also includes a light source 6, which is for a laser that transmits a group of laser beams 60 in the direction R. A partial transparent mirror or reflector 50 is arranged in the path of the beams 60 and is inclined at an angle such as 45° to the direction R. The reflector 50 will reflect a part of the laser light to a light absorber 10. A portion of the laser beam 60 is passed by the partially transparent mirror 50 and provides a weakened group of laser beams 61 which are received by a collector lens 33 and focused towards a coupling point 32 of a monomode light waveguide 3, which has another coupling point 31. Light can be input coupled and output coupled at both coupling points 31 and 32 and preferably the monomode light waveguide 3 consists of a glass fiber which has a core surrounded by a cladding layer and whose core has a diameter of a maximum of a few μm. The end surfaces of the core form the coupling points 31 and 32.

Preferably the glass fiber is wound in a coil as schematically illustrated. From the coupling point 31 of the monomode light waveguide 3, a group of light beams are emitted or uncoupled and received by a collective lens 30. This collective lens is arranged in such a manner that the light point or surface of the coupling point 31 lies in the focal planes of the lens 30 and the light being emitted from the coupling point 31 appears to be from a point source.

The lens 30 will emit a sharply focused group of parallel beams 61', which travel in a direction $R_1$ which does not necessarily coincide with the direction R. The group of parallel beams 61' strike a partially transparent reflector or mirror 5, which is preferably inclined at an angle of 45° to the direction $R_1$. This partially transparent reflector 5, which preferably has a reflectivity of 50% and transmissive capacity of 50%, reflects a portion of the group of the parallel beams 61 as a group or sub-beam 62' at right angles to the direction $R_1$ and passes the other portion of parallel beams in a direction $R_1$ as a group of sub-beams 62.

A linear polarizer P, a λ/4 plate 121 and a collective lens 8 are arranged consecutively in the direction of propagation of the group of sub-beams 62. In a similar manner, a linear polarizer P', a λ/4 plate 121' and a collective lens 8' are arranged in the path of the sub-beams 62'.

The linear polarizers P and P' produce linear polarized light. It is expedient to arrange these polarizers at the described position because at that position the danger of possible depolarization of the polarized light is not so great. The λ/4 plates 121 and 121' produce circularly polarized light from the linear polarized light. In other words, the λ/4 plate and the polarizer together produce circularly polarized light.

If the rotational measurement is carried out only on the basis of the Sagnac effect, the plates 121 and 121' are not necessary. However, the combination P and 121 reduces the amount of light reflected from fiber endface 11. This is also true for fiber endface 11' and plates 121' and P'. For example, since the Faraday effect functions only with circularly polarized light, a compensation of the Sagnac effect by the Faraday effect or for other purposes, means that the plates 121 and 121' are necessary. It is noted that the Sagnac effect will function under all polarization conditions of the light.

The lens 8 and 8' focus a group of sub-beams 62 and 62' onto the coupling points 11 and 11' of the optical waveguide 1. The optical waveguide 1 is a monomode light waveguide such as a glass fiber having a core K (FIG. 3) provided with a cladding layer. The core K has a diameter of a few μm at the maximum and its end surfaces form the coupling points 11 and 11'.

The light, which is input coupled into the waveguide 1 via the coupling points 11 and 11' is propagated in the light waveguide towards the other coupling point 11 and 11' where it is output coupled and converted by the lens 8 and 8' into sharply focused parallel beams 68 and 68' which pass through the λ/4 plates 121 and 121', respectively, and the linear polarizers P' and P and then hits the partially transparent reflector 5 at an angle 45°. The light, which is output coupled via the coupling point 11 of the light waveguide 1, is propagated as a group of parallel beams 68' opposite to the direction $R_1$ and the light which is output coupled via the other coupling point 11' of the light waveguide 1 is propagated as a sharply focused group of parallel beams 68 at right angles to the direction $R_1$.

A portion of each of the groups of parallel beams 68 and 68' pass through the partially transparent reflector 5 and continues to be propagated as a group of parallel beams in the same direction. The other light component of each of these groups of parallel beams 68 and 68' is reflected by the reflector 5 as a group of parallel beams which will be deflected 90° to the oncoming direction of the propagation of the parallel beams. Each reflected group of parallel beams is superimposed with a transmitted group of parallel beams and is propagated in the same direction.

In FIG. 1, one component or portion of the superimposed beams is a group 2 of parallel beams which has a portion of the beams 68' transmitted through the reflector 5 and the reflected portion of the beam 68 superimposed together. In a similar manner, a portion or component of the superimposed beams formed by a reflected portion of the group of beams 68' and a transmitted portion of the group of beaams 68 are superimposed together as beams 2'. Thus, the reflector 5 acts as means for superimposing the two beams 68 and 68' and creating two portions 2 and 2' of the superimposed beams.

The group of parallel beams 2 and the groups of parallel beams 61' are also superimposed on the same path. The group of parallel beams 2 are received by the lens 30, which focuses the group onto the coupling point 31 of the monomode light waveguide 3 at which point the group is input coupled into the waveguide.

The light component, which is output coupled via the other coupling point 32, is received by the lens 33 which converted the emerging group of beams into a sharply focused groups of parallel beams 20, which are directed at the partially transparent reflector 50 at an angle of 45°. A portion of this group of the parallel beams 20 are reflected at right angels as a group of parallel beams 21 which are received by a collective lens 34. The focal plane of the collective lens 34 is provided with an additional or further mode diaphragm 35, which is illustrated as a conventional mode diaphragm which is a diaphragm having an aperture with an extremely small diameter. This further mode diaphragm 35 serves merely to gate out or filter out disturbing reflections.

The light, which is passed the further mode diaphragm 35, is received on a light receiving surface 4 which is a light sensitive surface of a light sensitive detector 40, which measures the integral intensity of the oncoming light and produced an analog signal. The further mode diaphragm 35 could also consist of a monomode light waveguide.

The previously described ring interferometer 100 is already capable of fully functioning and can be used as a rotation sensor. With regard to the effects, which lead to a simulated rotation, which are eliminated by means of the present invention, reference is made to FIGS. 3 and 4. The two figures represent an enlarged view of one end of the core cladded glass fiber which has an optical axis A and forms the light waveguide 1 with the end surface as a coupling point 11. The lens 8 focuses the group of parallel beams 62 to a point F on the end surface 11 of the fiber 1 in the region of its core K. Assuming Gaussian optics, the optical axis A' of the group of parallel beams 62 is determined by a straight line which passes through the focused point F and the center point of the lens 8.

The ring interferometer would now be ideally adjusted if the axis A' were to coincide with the axis A. However, in practice this can only be achieved with finite accuracy. In practice, the two axes can be inclined relative to one another at an angle greater than zero (see FIG. 3). As illustrated, this leads to the fact that the axis A" of a group of parallel beams 68', which has emerged from the end surface 11 and has been focused by the lens 8, does not coincide precisely with the axis A' of the group of light beams 62 but extends parallel thereto and displaced therefrom.

It is also possible that the axis A' of a group of light beams 62 intersects the end surface 11 at a point laterally displaced from the axis A of the light waveguide 1 (see FIG. 4). In this case, the axis A''' of the group of parallel beams 68, which emerge from the end surface 11 and are focused by the lens 8 will be inclined relative to the axis A' of the group of parallel beams 62.

Furthermore, it can occur that the end surface 11 and the focus point F do not precisely coincide. In that case, the light emerging from the end surface 11, such as the beam 68', is not focused by the lens 8 to form a group of parallel beams but to form either a divergent or convergent group of beams.

For simplicity, with regard to these three possible situations, it has been assumed that the location of the focus for the emerging light beam 68' from the waveguide 1, which was in fact assumed to represent an ideal monomode waveguide, was situated on the end surface 11. The three effects, which have been described quantitatively, will generally occur in practice together. They will reduce the input coupling efficiency for the group of parallel beams 62 via the end surface 11 of the waveguide 1. However, this acts merely as an increase in fiber attenuation and does not result in any simulated rotation.

Similar considerations naturally also apply to the other coupling point 11' with the lens 8' and the group of light beams 62'. The position of the axis of the group of light beams 62' relative to the axis A' of the group of light beams 62 is determined by the reflector 5. In this basic example, the axis of the group of light beams 62' is at right angles to the axis of the group of light beams 62.

To summarize, it may be stated that the light which has been output coupled via the coupling points 11 and 11' and which returns via passages of air in the direction of the light source, travels over a somewhat different light path to a light which is supplied for input coupling. This means that the non-reciprocal effect is simulated.

By way of remedy, the invention proposes that a mode diaphragm 3 or 3' be arranged in a superimposed beam path 2 and 2' which light components commonly travel over a path in which a plurality of modes can be propagated. If the mode diaphragm 3 exhibits a very high attenuation for modes of higher order, tne only component of the light sources which component is emanating from the coupling points and which is absorbed, is that component, which, in the section between the coupling points 11 and 11' and the beam divider 5, has traveled over a path which corresponds with the highest degree of accuracy to the light path of the light source which light path has been input coupled via the end coupling points 11 and 11'. In this case, either no or a dimunitive non-reciprocal effect is simulated.

For reasons, which are not required to be explained at this point, in the ring interferometer 100 of FIG. 1, it is expedient to use light conducted in the group of parallel beams 2' for measuring purposes. For this reason, a light receiving surface 4' of a second light sensitive detector 40' is arranged in the beam path of the light. On account of the forementioned three effects, the light which is conducted in the group of beams 2' in the same way as the light conducted in the group of beams 2 contains modes of a higher order which can lead to an adulteration of the measured value.

Therefore, it is expedient to arrange a mode diaphragm which exhibits a high degree of attenuation for modes of a higher order in the path of the group of beams 2'. In accordance with FIG. 1 for this purpose, a monomode light waveguide 3' which possesses two coupling points 31' and 32' is arranged in the beam path 2'. The group of parallel beams 2' are received by a lens 30' which focuses the group of beams onto the coupling point 31' where it is input coupled into the waveguide 3'. The light, which has been output coupled via the other coupling point 32' is received by a lens 33' which converts a merging group of beams into a group of parallel beams 20' which hits the light receiving surface 4' of detector 40'.

However, the conditions, which govern the group of parallel beams 2' fundamentally differs from those relating to the group of parallel beams 2, which are superimposed with the groups of parallel beams 61'. If the optical axis of the coupling point 31' coincides precisely with the axis A', the same favorable properties are achieved as in the case of the light waveguide 3. Since however, this adjustment can only be carried out with finite accuracy, a deviation differing from zero must be expected. This deviation means that modes of a higher order are input coupled via the coupling point 31' of the light waveguide 3' so that for example a rotation is simulated. If the light waveguide 3' were to also conduct modes of a higher order or if it did not exist at all, the simulated rotations would generally be significantly greater.

The insertion of the monomode light waveguide 3' consequently improves the ring interferometer although the signals from the detector 40' only permit a highly accurate measurement of the rotation speed when the coupling point 31' is balanced accordingly. In practice, this is extremely difficult to achieve.

It must be stressed once more that the coupling point 31 of the light waveguide 3 is on the other hand always precisely adjusted relative to the optical axis A' as this axis is in fact determined by the position of the coupling point 31. The reason for this is that coupling point 31 emits the light which is required to operate the interferometer. Signals from the detector 40 therefore generally permit rotation speed to be established with a high degree of accuracy.

Figure 2:
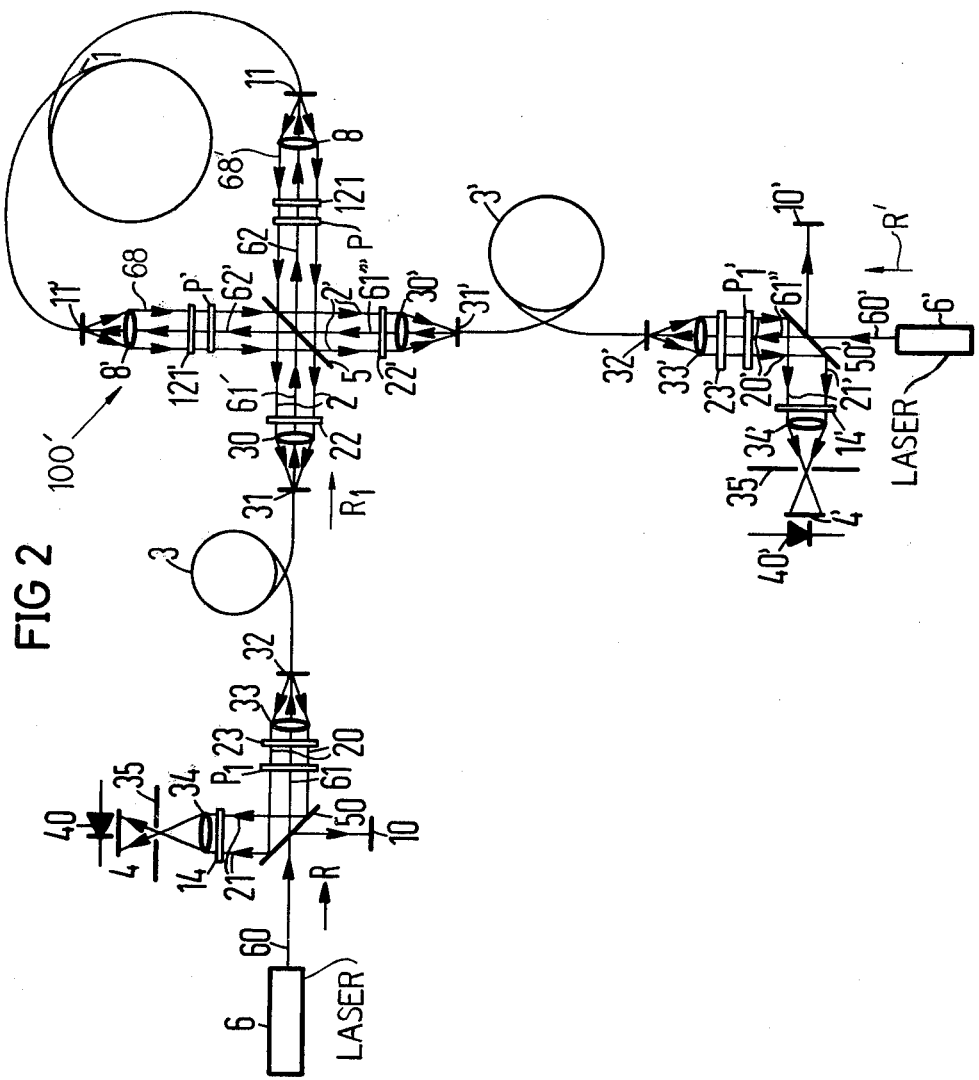
FIG. 2 is a schematic illustration of a modification of the ring interferometer illustrated in FIG. 1.

A modification or embodiment of the ring interferometer is generally indicated at 100' in FIG. 2. This interferometer 100' compensates for errors in the adjustment of the coupling point 31' of the waveguide 3' so these errors are ineffective. Although the device 100' does not eliminate the simulated phase shift, the true value of the rotation speed can be deduced.

The embodiment of the interferometer 100' differs from the embodiment of the interferometer 100 fundamentally in the terms of an additional light source 6', an additional partial transparent reflector 50', an additional lens 34' and an additional further mode diaphragm 35', which serves to eliminate disturbing reflections. Also the device 100' has additional linear polarizers $P_1$ and $P_1$, and additional $\lambda/4$ plates 22, 23, 22' and 23' which are arranged in the beam paths.

The additional light source 6', which is likewise designated as a laser, is arranged in such a manner that it transmits a group of laser beams 60' in the direction R'. In this group of laser beams, the additional partial transparent reflector 51 is arranged in an angle 45° to the direction R'. A portion of the group of laser beams 60' is reflected by the reflector 50' onto a light absorber 10'. The light component of the laser beam 60' which is passed through the reflector 50' continues in a direction R' as a weakened group of laser beams 61'' which passes through a polarizer $P_1$, and a $\lambda/4$ plate 23' to be received by a lens 33'. The lens 33' focuses the group of light beams 61'' onto the other coupling points 32' of the monomode waveguide 3' where it is input coupled into the waveguide. The light in the waveguide 3' is then output coupled at 31' and focused by lens 30' through a $\lambda/4$ plate 22' as a beam 61'''. The beam 61''' is directed at the partial transparent reflector 5, which directs a portion into each of the coupling points 11 and 11' of the waveguide 1. This input coupled light is propagated by the entire ring interferometer in the same manner as the light which would have been input coupled into the monomode waveguide 3.

The light component, which has been traveling in the waveguide 3' from the input coupling end 31' to the coupling end 32' is output coupled as a group of parallel beams 20', which is free of disturbing modes and is directed at the additional transparent reflector 50'. A component 21', which has been reflected by the reflector 50', is received by the additional lens 34', which has a focal plane which has the additional mode diaphragm 35'. The light which passes through the additional mode diaphragms 35' is received on the light receiving 4' of the sensor 40'.

If only the light source 6 of the device 100' is operated, generally modes of a higher order are input coupled into the light waveguide 3' via the coupling point 31' as a result the rotation can generally be established by the light receiving surface 4' with a considerable error.

If the light source 6 is now switched off and the light source 6' is switched on, the coupling point 31' and 31 exchange roles. Now the signal on the light receiving surface 4 will exhibit an error. However, for reasons of symmetry, the error of the surface 4 is opposed to the error produced by the signal on the light receiving surface 4'. By alternately switching on the light source 6 and 6' and by analysis of the signal on the light receiving surface 4' and 4, it is possible to eliminate the error. This can be effected by example by means of a value formation.

The alternate switching on and off of the light sources 6 and 6' can be avoided if the light source 6 transmits light of one color or wavelength and the light source 6' transmits light of another color or wavelength. Each of the light receiving surfaces 4 and 4' are preceded by a color filter 14 and 14' with the filter 14 being placed in the beam path 21 and transmitting only light emitted from the source 6' and the filter 14' being placed in the path of the beams 21' and transmitting only the frequency emitted by the light source 6. This means that the light receiving surface 4 only receives light from the source 6. In this case, a mean value formation can be directly obtained. However, it should be taken into consideration that the Sagnac effect employed on the rotation sensors is depended upon the wavelength of the light being used.

The polarizers such as $P_1$ and $P_{1'}$ and the quarter wave plates such as 22, 22' and 23, 23' are additional provided in the embodiment 100' and serve to avoid disturbing reflections.

Although various minor modifications may be suggested by those versed in the art, it should be understood that I wish to embody within the scope of the patent granted hereon, all such modifications as reasonably and properly come within the scope of my contribution to the art.

I claim:

1. In a ring interferometer having an optical waveguide wound in a coil and having two ends, each end providing a separate coupling location at which light from a first source is coupled into the light waveguide and propagates to the opposite end for uncoupling, said interferometer including first means for superimposing the light output coupled from one end with the light output coupled from the opposite end and creating two portions of superimposed output coupled light, means for directing one portion of output coupled light at a first light-receiving surface over a common path in a direction opposite to a direction of light from said first source being coupled into the waveguide, said common path being capable of propagating a plurality of modes, and means for directing the other portion of the two portions of superimposed output coupled light at a second light-receiving surface, the improvements comprising a first mode diaphragm transmitting only one mode being arranged in the common path to receive the one portion of the superimposed beam and the light from the first source, a second mode diaphragm disposed in the path of said other portion, and a separate second light source being arranged for coupling into the second mode diaphragms so that light can be coupled into said optical waveguide either from the first source through the first mode diaphragm or from the second source through the second mode diaphragm and the portion of superimposed output light being received at the first light-receiving surface passes through the same mode diaphragm as the light from the first source.

2. In a ring interferometer according to claim 1, wherein each of the mode diaphragms are the same and comprise a monomode light waveguide having coupling points at each end and means for input and output coupling light therefrom.

3. In a ring interferometer according to claim 1, wherein the second light source has a different wavelength than the first light source, wherein a filter is interposed in the path of light reaching each detector with the filter for the first mentioned detector passing only the wavelengths from the second light source and the filter for the second detector passing light of the wavelength of the first source.

4. In a ring interferometer having an optical waveguide wound in a coil and having two ends, each end providing a separate coupling location at which light from a first source is coupled into the light waveguide and propagates to the opposite end for uncoupling, said interferometer including first means for superimposing the light output coupled from one end with the light output coupled from the opposite end and creating two portions of superimposed output coupled light, means for directing one portion of output coupled light at a light receiving surface over a common path in a direction opposite to a direction of light from said source being coupled into the waveguide, said common path being capable of propagating a plurality of modes, and means for directing the other portion of the two portions of superimposed output coupled light at a second light receiving surface, the improvements comprising a mode diaphragm transmitting only one mode being arranged in the common path to receive the one portion of the superimposed beam and the light from the first source, a second mode diaphragm disposed in the path of said other portion, and a separate second light source being arranged for coupling into the second mode diaphragms so that light can be coupled into said optical waveguide either from the first source through the first mode diaphragm or from the second source through the second mode diaphragm.

5. In a ring interferometer according to claim 4, wherein each of the mode diaphragms are the same and comprise a monomode light waveguide having coupling points at each end and means for input and output coupling light therefrom.

6. In a ring interferometer according to claim 4, wherein the second light source has a different wavelength than the first light source, wherein a filter is interposed in the path of light reaching each detector with the filter for the first mentioned detector passing only the wavelengths from the second light source and the filter for the second detector passing light of the wavelength of the first source.

7. In a ring interferometer according to claim 4, wherein each mode diaphragm consists of a monomode light waveguide having two coupling points and including means for input and output coupling light into each of said points.

8. In a ring interferometer according to claim 7, wherein each monomode light waveguide consists of a glass fiber having a core surrounded by a cladding, said fiber having end surfaces forming said coupling points.

9. In a ring interferometer according to claim 8, wherein the length of each glass fiber is selected so that cladding modes propagated from the one surface toward the other surface are extinguished prior to reaching the other surface.

10. In a ring interferometer according to claim 8, wherein each glass fiber is provided with means for stripping cladding modes therefrom.

11. In a ring interferometer according to claim 7, wherein each monomode light waveguide is wound in a coil.

* * * * *